(12) United States Patent
Pappoppula et al.

(10) Patent No.: US 9,171,399 B2
(45) Date of Patent: Oct. 27, 2015

(54) SHADOW RENDERING IN A 3D SCENE BASED ON PHYSICAL LIGHT SOURCES

(71) Applicant: Autodesk, Inc., San Rafael, CA (US)

(72) Inventors: Murali Pappoppula, Singapore (SG); Gunjan Porwal, Singapore (SG)

(73) Assignee: Autodesk, Inc., San Rafael, CA (US)

( * ) Notice: Subject to any disclaimer, the term of this patent is extended or adjusted under 35 U.S.C. 154(b) by 262 days.

(21) Appl. No.: 13/796,619

(22) Filed: Mar. 12, 2013

(65) Prior Publication Data

US 2014/0267270 A1 Sep. 18, 2014

(51) Int. Cl.
*G06T 15/00* (2011.01)
*G06T 15/60* (2006.01)

(52) U.S. Cl.
CPC .............. *G06T 15/60* (2013.01); *G06T 2215/16* (2013.01)

(58) Field of Classification Search
CPC ............................ G06T 2215/16; G06T 15/60
USPC .......................... 345/419, 426, 427, 156, 173
See application file for complete search history.

(56) References Cited

U.S. PATENT DOCUMENTS

| | | | | |
|---|---|---|---|---|
| 6,842,175 | B1* | 1/2005 | Schmalstieg et al. | 345/427 |
| 7,259,747 | B2* | 8/2007 | Bell | 345/156 |
| 8,139,059 | B2* | 3/2012 | Trepte | 345/426 |
| 8,896,600 | B2* | 11/2014 | George | 345/426 |
| 2005/0122308 | A1* | 6/2005 | Bell et al. | 345/156 |
| 2007/0063981 | A1* | 3/2007 | Galyean et al. | 345/173 |
| 2008/0211813 | A1* | 9/2008 | Jamwal et al. | 345/426 |

* cited by examiner

*Primary Examiner* — Phu K Nguyen
(74) *Attorney, Agent, or Firm* — Gates & Cooper LLP

(57) ABSTRACT

A method, system, and computer program product/computer readable storage medium provide the ability to render a shadow. A three-dimensional (3D) scene comprising an object is obtained. An external physical light source that is external to the 3D scene is detected by a sensor. An artificial light source is created in the 3D scene that corresponds to the external physical light source. Based on the artificial light source, a shadow of the object is cast. The 3D scene including the object and the shadow are then rendered.

24 Claims, 6 Drawing Sheets

SHADOW RENDERING IN A 3D SCENE BASED ON PHYSICAL LIGHT SOURCES

BACKGROUND OF THE INVENTION

1. Field of the Invention

The present invention relates generally to three-dimensional (3D) rendering of a scene, and in particular, to a method, apparatus, and article of manufacture for illuminating and creating shadows based on external light sources present in a user's physical environment.

2. Description of the Related Art

Stereoscopy is a method for presenting an illusion of 3D depth from images on a two-dimensional (2D) plane. To create such an illusion, two slightly offset images are presented separately to the left and right eye of a viewer. Various techniques may be used to mechanically present the 3D illusion to a user. Some stereoscopic techniques may require a viewer to wear glasses that combine the images from two offset sources and/or to filter offset images from a single source separated to each eye. Alternatively, in a technique known as autostereoscopy, a lightsource may split the images directionally into the viewer's eyes (without requiring glasses).

Regardless of the technique used to provide stereoscopy, a 3D rendering of a scene (stereoscopic or non-stereoscopic) will not give depth perception if there are no shadows associated with the objects that are being rendered. The human brain analyzes the shadows cast by the objects due to ambient light conditions for depth perception. For example, a 3D render of a ball bouncing on a flat surface without the associated shadows does not convey the correct sense of depth as well as motion to the user. Similarly, a monster character coming out of a screen in a stereoscopic game would give a more accurate impression of depth to a user only when it projects associated shadows.

FIG. 1 illustrates the shadow rendering of the prior art. A 3D scene 102 is displayed within a stereoscopic 3D display 104. A light source 106 present within scene 102 casts a shadow 108. Since the scene 102 is stereoscopic, it is desirable for external light 110 to affect the shadows. However, as illustrated in FIG. 1, in the prior art, such external light sources 110 do not affect the shadow 108 or view of the scene 102.

Furthermore, it is desirable to render a very realistic scene that blends in with the surroundings of the display system. Such a rendering is possible if the illumination and shadows in the scene are cast based on the ambient light sources present in a user's physical environment. The prior art fails to provide such a capability.

SUMMARY OF THE INVENTION

Prior art display and rendering systems do not have the capability to detect and utilize external light sources for illumination and generating shadows. Embodiments of the invention attempt to solve the problem by utilizing a system and method consisting of a display system with optical sensors that can detect the ambient (and/or other) light source(s) and a rendering software capable of creating virtual light sources based on the information from the sensor and data from the display system in the 3D scene.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention illuminate and create shadows based on external light sources present in a user's physical environment.

Hardware Environment

Figure 2:
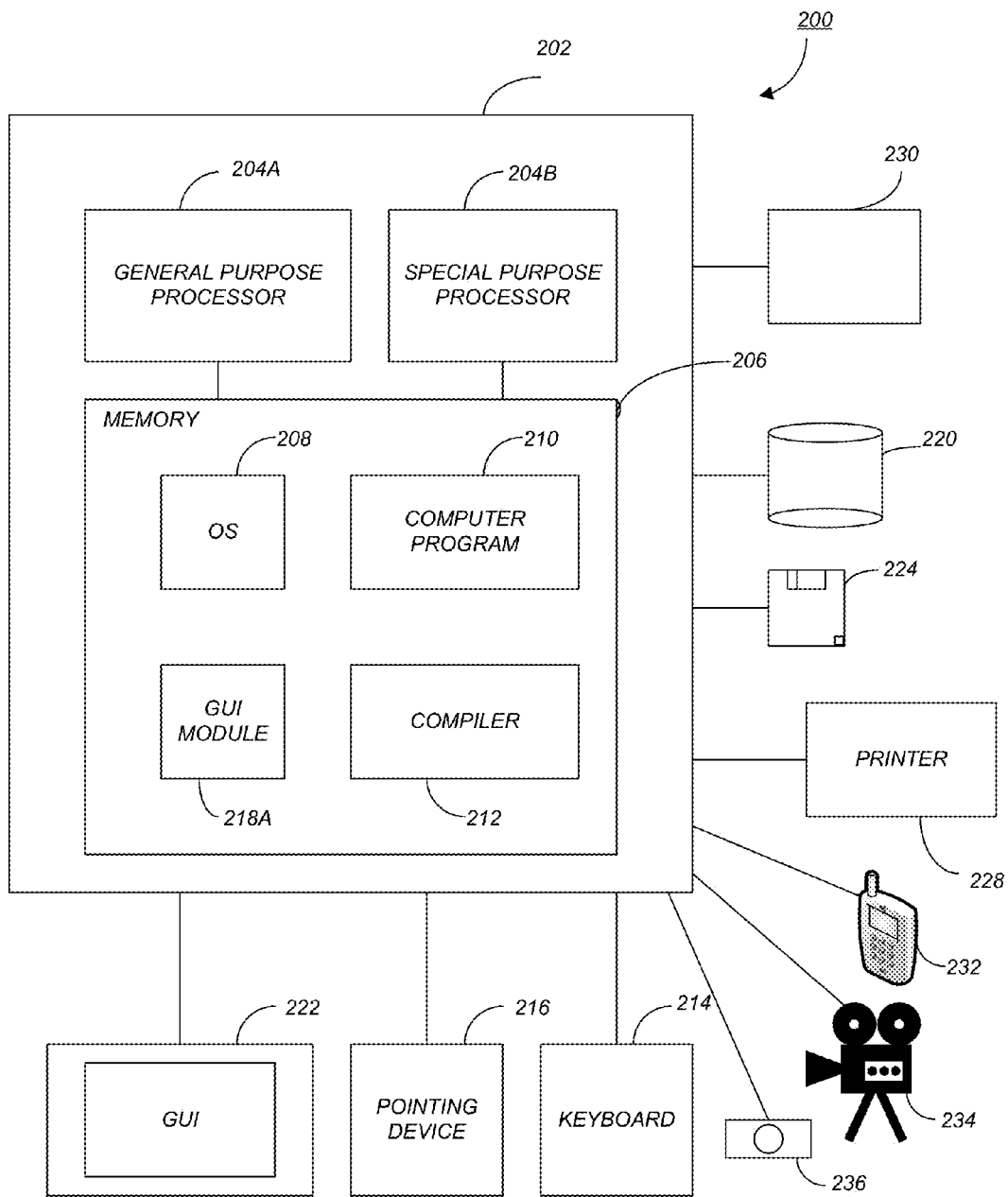
FIG. 2 is an exemplary hardware and software environment used to implement one or more embodiments of the invention.

FIG. 2 is an exemplary hardware and software environment 200 used to implement one or more embodiments of the invention. The hardware and software environment includes a computer 202 and may include peripherals. Computer 202 may be a user/client computer, server computer, or may be a database computer. The computer 202 comprises a general purpose hardware processor 204A and/or a special purpose hardware processor 204B (hereinafter alternatively collectively referred to as processor 204) and a memory 206, such as random access memory (RAM). The computer 202 may be coupled to, and/or integrated with, other devices, including input/output (I/O) devices such as a keyboard 214, a cursor control device 216 (e.g., a mouse, a pointing device, pen and tablet, touch screen, multi-touch device, etc.) and a printer 228. In one or more embodiments, computer 202 may be coupled to, or may comprise, a portable or media viewing/listening device 232 (e.g., an MP3 player, iPod™, Nook™, portable digital video player, cellular device, personal digital assistant, etc.). In yet another embodiment, the computer 202 may comprise a multi-touch device, mobile phone, gaming system, internet enabled television, television set top box, or other internet enabled device executing on various platforms and operating systems.

In one embodiment, the computer 202 operates by the general purpose processor 204A performing instructions defined by the computer program 210 under control of an operating system 208. The computer program 210 and/or the operating system 208 may be stored in the memory 206 and may interface with the user and/or other devices to accept input and commands and, based on such input and commands and the instructions defined by the computer program 210 and operating system 208, to provide output and results.

Output/results may be presented on the display 222 or provided to another device for presentation or further processing or action. In one embodiment, the display 222 comprises a liquid crystal display (LCD) having a plurality of separately addressable liquid crystals. Alternatively, the display 222 may comprise a light emitting diode (LED) display having clusters of red, green and blue diodes driven together to form full-color pixels. Each liquid crystal or pixel of the display 222 changes to an opaque or translucent state to form a part of the image on the display in response to the data or information generated by the processor 204 from the application of the instructions of the computer program 210 and/or operating system 208 to the input and commands.

In various embodiments of the invention, the display 222 is a 3D display device which may comprise a 3D enabled display (e.g., 3D television set or monitor), a head mounted display (e.g., a helmet or glasses with two small LCD or OLED [organic light emitting diode] displays with magnifying lenses, one for each eye), active or passive 3D viewers (e.g., LC shutter glasses, linearly polarized glasses, circularly polarized glasses, etc.), etc. In this regard, any technique that may be utilized to view 3D stereoscopic images is represented by display 222. Further, one or more stereoscopic cameras 234 may be configured to communicate with computer 200 to enable a 3D display on 3D display 222. In addition, an optical, infrared, or other type of sensor 236 may be communicatively coupled to the computer and may be configured on/near the display 222. As described in further detail below, such a sensor 236 is configured to detect real external light sources (e.g., the sun, a light bulb, LED light, etc.).

The 3D image may be provided through a graphical user interface (GUI) module 218A. Although the GUI module 218A is depicted as a separate module, the instructions performing the GUI functions can be resident or distributed in the operating system 208, the computer program 210, or implemented with special purpose memory and processors.

In one or more embodiments, the display 222 is integrated with/into the computer 202 and comprises a multi-touch device having a touch sensing surface (e.g., track pod or touch screen) with the ability to recognize the presence of two or more points of contact with the surface. Examples of multi-touch devices include mobile devices (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 202 according to the computer program 210 instructions may be implemented in a special purpose processor 204B. In this embodiment, the some or all of the computer program 210 instructions may be implemented via firmware instructions stored in a read only memory (ROM), a programmable read only memory (PROM) or flash memory within the special purpose processor 204B or in memory 206. The special purpose processor 204B may also be hardwired through circuit design to perform some or all of the operations to implement the present invention. Further, the special purpose processor 204B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 202 may also implement a compiler 212 that allows an application program 210 written in a programming language such as COBOL, Pascal, C++, FORTRAN, or other language to be translated into processor 204 readable code. Alternatively, the compiler 212 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 210 accesses and manipulates data accepted from I/O devices and stored in the memory 206 of the computer 202 using the relationships and logic that were generated using the compiler 212.

The computer 202 also optionally comprises an external communication device such as a modem, satellite link, Ethernet card, or other device for accepting input from, and providing output to, other computers 202.

In one embodiment, instructions implementing the operating system 208, the computer program 210, and the compiler 212 are tangibly embodied in a non-transient computer-readable medium, e.g., data storage device 220, which could include one or more fixed or removable data storage devices, such as a zip drive, floppy disc drive 224, hard drive, CD-ROM drive, tape drive, etc. Further, the operating system 208 and the computer program 210 are comprised of computer program instructions which, when accessed, read and executed by the computer 202, cause the computer 202 to perform the steps necessary to implement and/or use the present invention or to load the program of instructions into a memory, thus creating a special purpose data structure causing the computer to operate as a specially programmed computer executing the method steps described herein. Computer program 210 and/or operating instructions may also be tangibly embodied in memory 206 and/or data communications devices 230, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 202.

Figure 3:
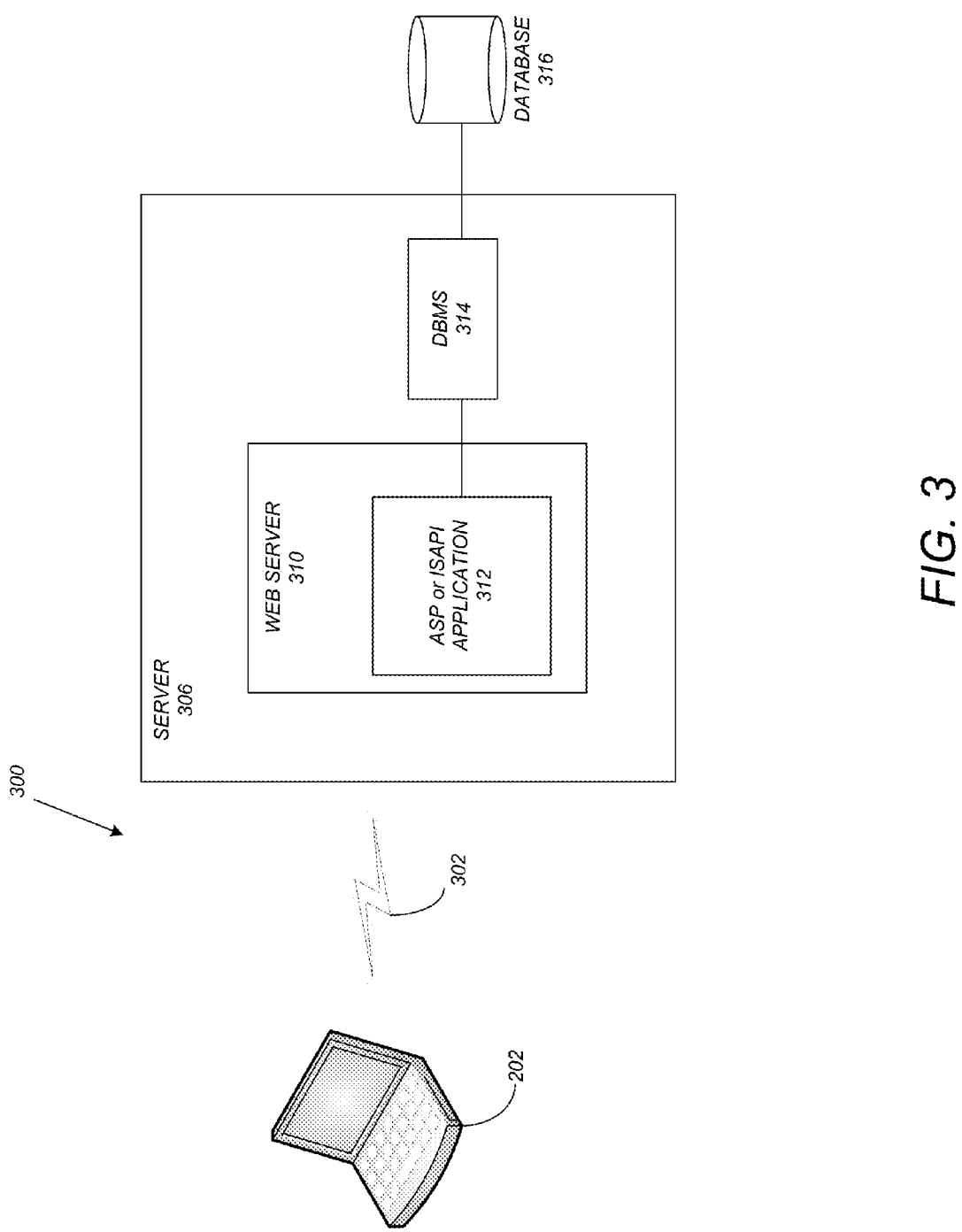
FIG. 3 schematically illustrates a typical distributed computer system using a network to connect client computers to server computers in accordance with one or more embodiments of the invention.

FIG. 3 schematically illustrates a typical distributed computer system 300 using a network 302 to connect client computers 202 to server computers 306. A typical combination of resources may include a network 302 comprising the Internet, LANs (local area networks), WANs (wide area networks), SNA (systems network architecture) networks, or the like, clients 202 that are personal computers or workstations, and servers 306 that are personal computers, workstations, minicomputers, or mainframes (as set forth in FIG. 2). However, it may be noted that different networks such as a cellular network (e.g., GSM [global system for mobile communications] or otherwise), a satellite based network, or any other type of network may be used to connect clients 202 and servers 306 in accordance with embodiments of the invention.

A network 302 such as the Internet connects clients 202 to server computers 306. Network 302 may utilize ethernet, coaxial cable, wireless communications, radio frequency (RF), etc. to connect and provide the communication between clients 202 and servers 306. Clients 202 may execute a client application or web browser and communicate with server computers 306 executing web servers 310. Such a web browser is typically a program such as MICROSOFT INTERNET EXPLORER™, MOZILLA FIREFOX™, OPERA™, APPLE SAFARI™, GOOGLE CHROME™, etc. Further, the software executing on clients 202 may be downloaded from server computer 306 to client computers 202 and installed as a plug-in or ACTIVEX™ control of a web browser. Accordingly, clients 202 may utilize ACTIVEX™ components/component object model (COM) or distributed COM (DCOM) components to provide a user interface on a display of client 202. The web server 310 is typically a program such as MICROSOFT'S INTERNET INFORMATION SERVER™.

Web server 310 may host an Active Server Page (ASP) or Internet Server Application Programming Interface (ISAPI) application 312, which may be executing scripts. The scripts invoke objects that execute business logic (referred to as business objects). The business objects then manipulate data in database 316 through a database management system (DBMS) 314. Alternatively, database 316 may be part of, or connected directly to, client 202 instead of communicating/obtaining the information from database 316 across network 302. When a developer encapsulates the business functionality into objects, the system may be referred to as a component object model (COM) system. Accordingly, the scripts executing on web server 310 (and/or application 312) invoke COM objects that implement the business logic. Further, server 306 may utilize MICROSOFT'S™ Transaction Server (MTS) to access required data stored in database 316 via an interface such as ADO (Active Data Objects), OLE DB (Object Linking and Embedding DataBase), or ODBC (Open DataBase Connectivity).

Generally, these components 300-316 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 202 and 306 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 202 and 306.

Embodiments of the invention are implemented as a software application on a client 202 or server computer 306. Further, as described above, the client 202 or server computer 306 may comprise a thin client device or a portable device that has a multi-touch-based and/or 3D enabled display capability.

Shadow Rendering in a 3D Scene Based on a Physical Light Source

Figure 1:
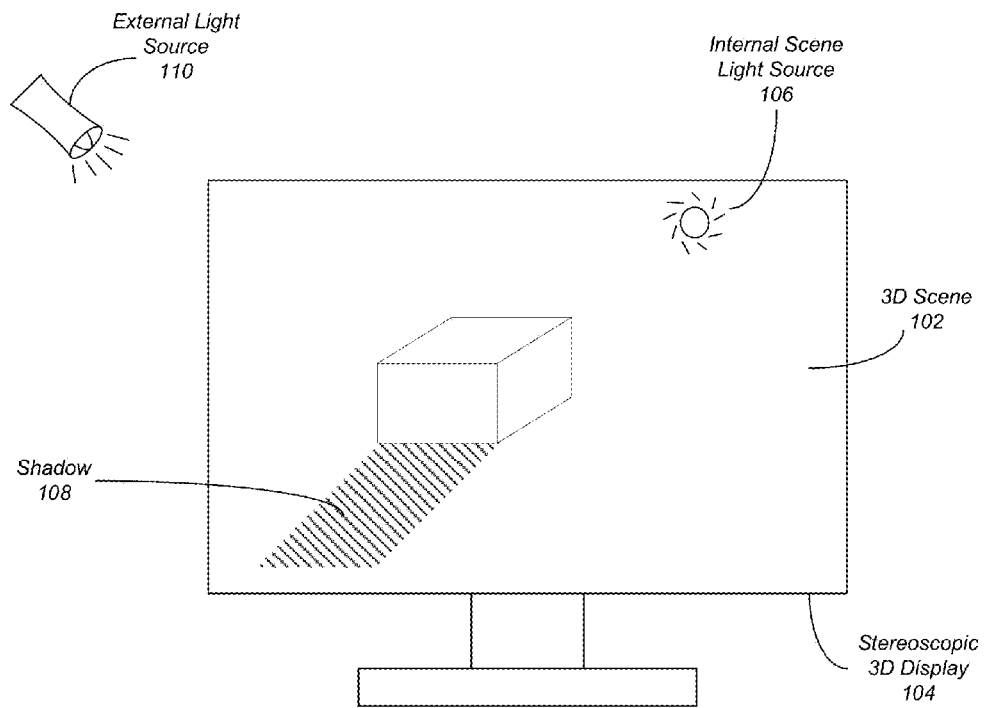
FIG. 1 illustrates a shadow rendering in the prior art.
Figure 4:
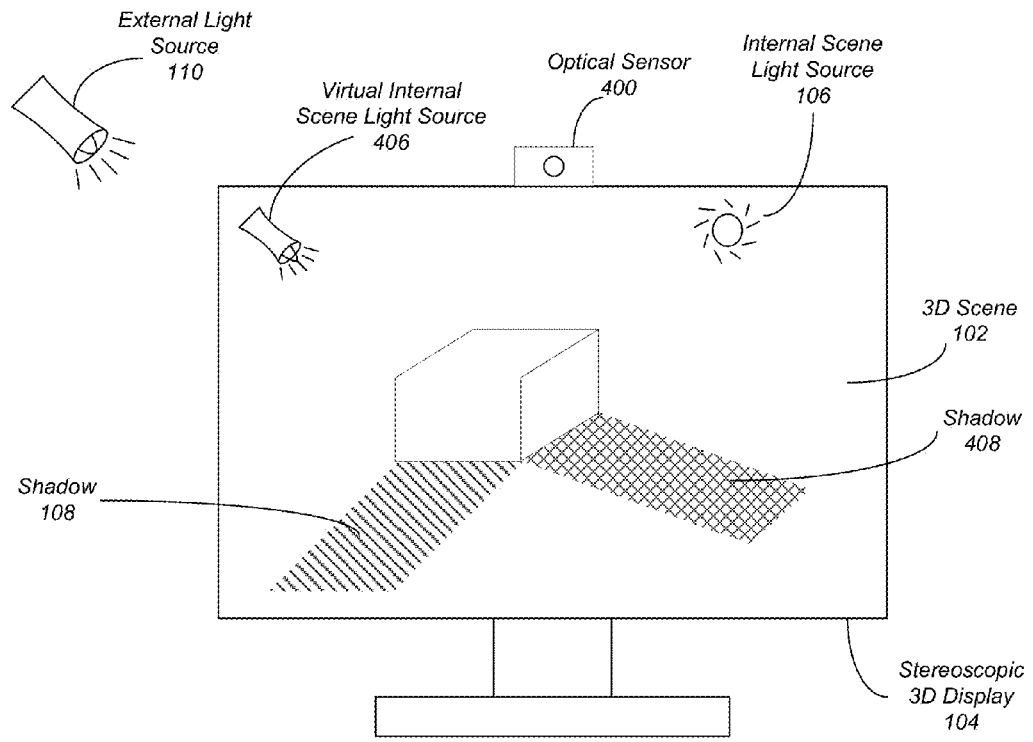
FIG. 4 illustrates a shadow rendering taking environment light sources into account in accordance with one or more embodiments of the invention.

FIG. 4 illustrates a shadow rendering taking environment light sources into account in accordance with one or more embodiments of the invention. Considering the 3D scene 102 of FIG. 1, initially, the scene only has one shadow cast by light sources within scene 102. In FIG. 4, the external light sources 110 (i.e., the light sources in the environment) are detected by an optical sensor 400. Based on the detection of the external light source 110, a new virtual internal light source 406 (that corresponds to external physical light source 110) is created that casts a new shadow 408.

Thus, one or more optical sensors 400 are configured to detect the color, direction, and intensity of the light sources 110 (e.g., point light, spherical light, ambient light, etc.) available in the physical environment.

The data from the light sensors 400 is used by the appropriate application/software 210 (e.g., game, movie, DCC [digital content creation] software or stereoscopic rendering software) for rendering the scene 102. A rendering module in the software 210 creates artificial light sources 406 in the scene, which correspond to the same color, direction and intensity as the original light sources 110 in the environment. These virtual light sources 406 would then cast shadows for the 3D objects which are to be rendered.

In another example, consider a stereoscopic rendering where there are two different external light sources 110 that exists in the physical environment and a ball bouncing in a scene 102 to be stereoscopically rendered. In a real world scenario, the ball would cast two shadows due to each light source 110 which is very essential information for the human brain for depth/motion perception. In a typical prior art stereoscopic render, the light sources in the scene 106 would have no correlation to the physical external lights 110. With the information from optical sensors 400, a virtual light source 406 with appropriate characteristics mirroring the physical light source 110 is created within the scene 102. Thus, when the ball is rendered, its shadows would also be rendered in stereoscopic mode. Such a rendering is a more natural/realistic visual appearance to the rendered objects.

Figure 5:
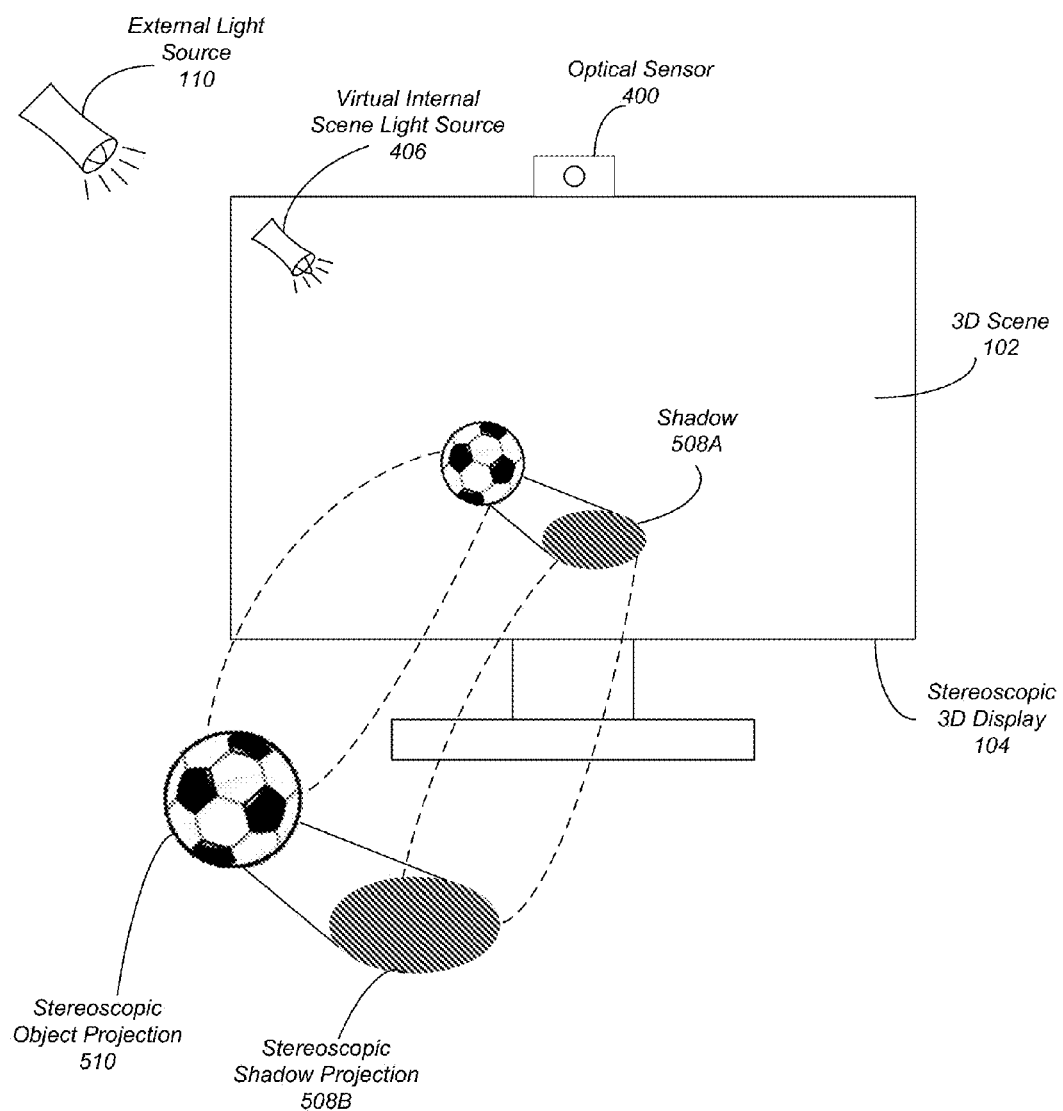
FIG. 5 illustrates a stereoscopic rendering in accordance with one or more embodiments of the invention.

FIG. 5 illustrates a stereoscopic rendering in accordance with one or more embodiments of the invention. Initially, there is no light source 106 in the scene. In accordance with embodiments of the invention, the optical sensor 400 detects the external light source 110. The information regarding the external light source 110 is passed to software that creates a virtual light source 406 in the scene 102. This light source 406 generates a shadow 508A. The ball is projected as stereoscopic object projection 510 in stereoscopic mode. Similarly, the shadow 508A is also projected 508B in stereoscopic mode, providing an impression that the stereoscopic shadow 508B has been generated by the physical light source 110. Such a feature may be optional for the user.

In view of the above, the visual system of embodiments of the invention may be used for the following:

(1) Rendering 3D objects along with their shadows in an augmented reality scene in regular, portable or eye-wear display systems;

(2) High quality display systems for a virtual product showcase or demonstrations; and/or (3) Interactive scenarios such as games, walkthroughs, etc.

Logical Flow

Figure 6:
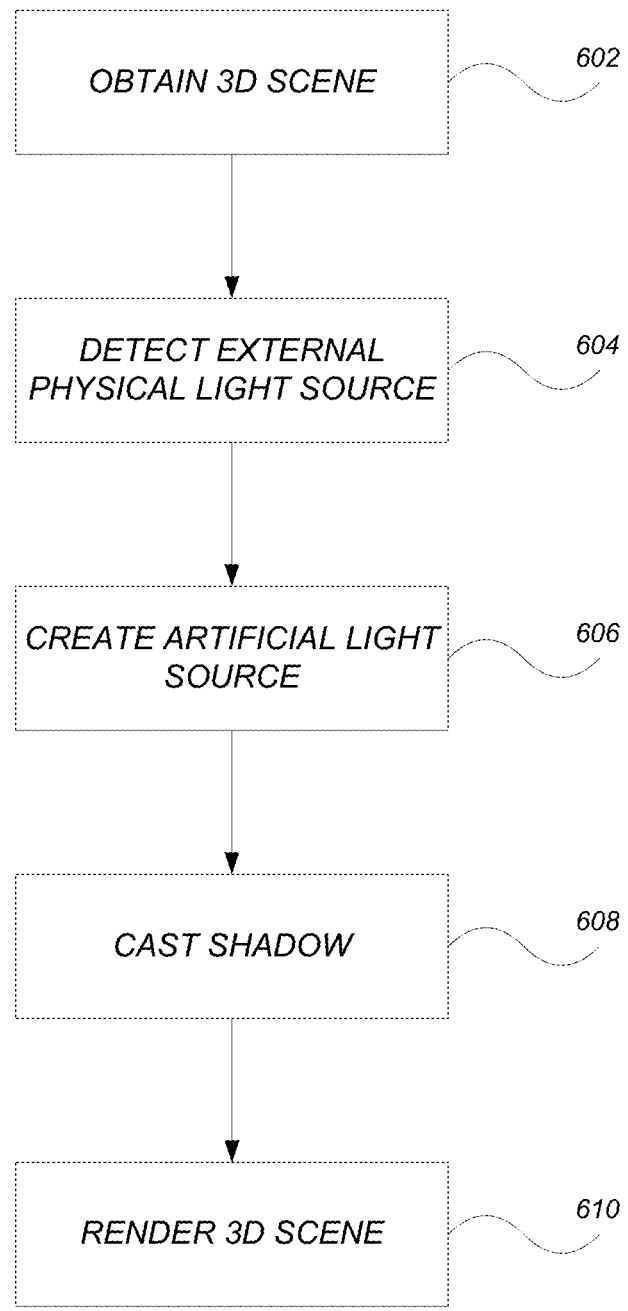
FIG. 6 illustrates the logical flow for rendering a shadow in accordance with one or more embodiments of the invention.

FIG. 6 illustrates the logical flow for rendering a shadow in accordance with one or more embodiments of the invention.

At step 602, a three-dimensional (3D) scene comprising an object is obtained.

At step 604, an external physical light source (that is external to the 3D scene) is detected (i.e., via a sensor [e.g., optical, infrared, etc.]). Such an external physical light source may be a point light, a spherical light, an ambient light, etc.

At step 606, an artificial light source is created in the 3D scene that corresponds to the external physical light source. The sensor may detect color, direction, and intensity of the external physical light source and the artificial light source corresponds to the same color, direction, and intensity.

At step 608, based on the artificial light source, a shadow of the object is cast.

At step 610, the 3D scene, including the object and the shadow, is rendered. Such a rendering may be stereoscopic or non-stereoscopic. In a stereoscopic projection/rendering, the object and the shadow are rendered in stereoscopic mode, and the shadow simulates a real shadow that would be cast by the external physical light source.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for rendering a shadow comprising:
   obtaining, in a computer, a three-dimensional (3D) scene comprising an object;
   detecting, via a sensor, an external physical light source that is external to the 3D scene;
   creating, in the computer, an artificial light source in the 3D scene that corresponds to the external physical light source;
   based on the artificial light source, casting, in the computer, a shadow of the object; and
   rendering, via the computer, the 3D scene including the object and the shadow, wherein:
      the rendering comprises a stereoscopic projection;
      the object and the shadow are rendered in stereoscopic mode; and
      the shadow simulates a real shadow that would be cast by the external physical light source.

2. The computer-implemented method of claim 1, wherein:
   the sensor detects color, direction, and intensity of the external physical light source; and
   the artificial light source corresponds to the same color, direction, and intensity of the external physical light source.

3. The computer-implemented method of claim 1, wherein the external physical light source comprises a point light.

4. The computer-implemented method of claim 1, wherein the external physical light source comprises a spherical light.

5. The computer-implemented method of claim 1, wherein the external physical light source comprises an ambient light.

6. The computer-implemented method of claim 1, wherein the sensor comprises an optical sensor.

7. The computer-implemented method of claim 1, wherein:
   the 3D scene further comprises an internal virtual light source;
   the casting of the shadow is based on both the artificial light source and the internal virtual light source.

8. The computer-implemented method of claim 1, further comprising:
   detecting, via the sensor, a second external physical light source that is external to the 3D scene;
   creating, in the computer, a second artificial light source in the 3D scene that corresponds to the second external physical light source;
   based on the second artificial light source, casting, in the computer, a second shadow of the object; and
   wherein the rendering simultaneously renders the 3D scene including the object, the shadow, and the second shadow.

9. A system for rendering a shadow in a computer system comprising:
   (a) a computer having a memory;
   (b) a sensor communicatively coupled to the computer, wherein the sensor is configured to detect an external physical light source; and
   (c) an application executing on the computer, wherein the application is configured to:
      (1) obtain a three-dimensional (3D) scene comprising an object;
      (2) receive information regarding the external physical light source from the sensor;
      (3) create an artificial light source in the 3D scene that corresponds to the external physical light source;
      (4) cast, based on the artificial light source, a shadow of the object; and
      (5) render the 3D scene including the object and the shadow, wherein:
         (i) the rendering comprises a stereoscopic projection;
         (ii) the object and the shadow are rendered in stereoscopic mode; and
         (iii) the shadow simulates a real shadow that would be cast by the external physical light source.

10. The system of claim 9, wherein:
   the sensor detects color, direction, and intensity of the external physical light source; and
   the artificial light source corresponds to the same color, direction, and intensity of the external physical light source.

11. The system of claim 9, wherein the external physical light source comprises a point light.

12. The system of claim 9, wherein the external physical light source comprises a spherical light.

13. The system of claim 9, wherein the external physical light source comprises an ambient light.

14. The system of claim 9, wherein the sensor comprises an optical sensor.

15. The system of claim 9, wherein:
   the 3D scene further comprises an internal virtual light source;
   the casting of the shadow is based on both the artificial light source and the internal virtual light source.

16. The system of claim 9, wherein:
   the sensor is further configured to detect a second external physical light source that is external to the 3D scene;
   the application is further configured to:
      create a second artificial light source in the 3D scene that corresponds to the second external physical light source;
      based on the second artificial light source, cast a second shadow of the object; and
      wherein the application is configured to render the 3D scene by simultaneously rendering the object, the shadow, and the second shadow.

17. A non-transitory computer readable storage medium encoded with computer program instructions which when accessed by a computer cause the computer to load the program instructions to a memory therein creating a special purpose data structure causing the computer to operate as a specially programmed computer, executing a method of rendering a shadow, comprising:
   obtaining, in the specially programmed computer, a three-dimensional (3D) scene comprising an object;
   detecting, via a sensor, an external physical light source that is external to the 3D scene;

creating, in the specially programmed computer, an artificial light source in the 3D scene that corresponds to the external physical light source;

based on the artificial light source, casting, in the specially programmed computer, a shadow of the object; and rendering, via the specially programmed computer, the 3D scene including the object and the shadow, wherein:
the rendering comprises a stereoscopic projection;
the object and the shadow are rendered in stereoscopic mode; and
the shadow simulates a real shadow that would be cast by the external physical light source.

18. The non-transitory computer readable storage medium of claim 17, wherein:
the sensor detects color, direction, and intensity of the external physical light source; and
the artificial light source corresponds to the same color, direction, and intensity of the external physical light source.

19. The non-transitory computer readable storage medium of claim 17, wherein the external physical light source comprises a point light.

20. The non-transitory computer readable storage medium of claim 17, wherein the external physical light source comprises a spherical light.

21. The non-transitory computer readable storage medium of claim 17, wherein the external physical light source comprises an ambient light.

22. The non-transitory computer readable storage medium of claim 17, wherein the sensor comprises an optical sensor.

23. The non-transitory computer readable storage medium of claim 17, wherein:
the 3D scene further comprises an internal virtual light source;
the casting of the shadow is based on both the artificial light source and the internal virtual light source.

24. The non-transitory computer readable storage medium of claim 17, further comprising:
detecting, via the sensor, a second external physical light source that is external to the 3D scene;
creating, in the specially programmed computer, a second artificial light source in the 3D scene that corresponds to the second external physical light source;
based on the second artificial light source, casting, in the specially programmed computer, a second shadow of the object; and
wherein the rendering simultaneously renders the 3D scene including the object, the shadow, and the second shadow.

* * * * *